United States Patent
Lambert et al.

(10) Patent No.: US 6,810,661 B2
(45) Date of Patent: Nov. 2, 2004

(54) METHOD AND SYSTEM FOR FREEZE PROTECTING LIQUID $NO_x$ REDUCTANTS FOR VEHICLE APPLICATION

(75) Inventors: Christine Kay Lambert, Westland, MI (US); Rolf Backes, Stolberg, DE (US)

(73) Assignee: Ford Global Technologies, LLC, Dearborn, MI (US)

(*) Notice: Subject to any disclaimer, the term of this patent is extended or adjusted under 35 U.S.C. 154(b) by 8 days.

(21) Appl. No.: 10/064,719

(22) Filed: Aug. 9, 2002

(65) Prior Publication Data

US 2004/0025498 A1 Feb. 12, 2004

(51) Int. Cl.[7] ................................................. F01N 3/00
(52) U.S. Cl. ........................... 60/286; 60/274; 60/295; 123/41.42; 123/541; 220/4.14
(58) Field of Search .................. 60/274, 286, 295, 60/303; 123/41.42, 541; 220/4.14, 562, 564, 723

(56) References Cited

U.S. PATENT DOCUMENTS

| | | | |
|---|---|---|---|
| 3,628,516 A | * 12/1971 | Perrin et al. | ................. 123/541 |
| 4,099,488 A | 7/1978 | Damon | |
| 4,805,571 A | 2/1989 | Humphrey | |
| 4,941,999 A | * 7/1990 | Noisier | ........................ 123/541 |
| 5,543,123 A | 8/1996 | Hofmann et al. | |
| 5,809,774 A | 9/1998 | Peter-Hoblyn et al. | |
| 5,884,475 A | 3/1999 | Hofmann et al. | |
| 5,976,475 A | 11/1999 | Peter-Hoblyn et al. | |
| 5,979,420 A | 11/1999 | Kawamura | |
| 6,063,350 A | 5/2000 | Tarabulski et al. | |
| 6,209,313 B1 | * 4/2001 | Wissler et al. | ................. 60/286 |
| 6,223,526 B1 | 5/2001 | Wissler et al. | |
| 6,273,120 B1 | * 8/2001 | Hofmann et al. | ............. 60/286 |
| 6,293,097 B1 | 9/2001 | Wu et al. | |
| 6,314,722 B1 | 11/2001 | Matros et al. | |
| 6,361,754 B1 | * 3/2002 | Peter-Hoblyn et al. | ........ 60/274 |
| 6,387,336 B2 | * 5/2002 | Marko et al. | ................. 60/286 |
| 6,519,935 B2 | * 2/2003 | Weigl | ........................... 60/295 |
| 2003/0101715 A1 | 6/2003 | Huthwohl | |

FOREIGN PATENT DOCUMENTS

| | | |
|---|---|---|
| EP | 0 321 085 | 6/1989 |
| WO | WO 00/21881 | 4/2000 |
| WO | WO 00/75643 | 12/2000 |

* cited by examiner

Primary Examiner—Tu M. Nguyen
(74) Attorney, Agent, or Firm—Brooks Kushman PC; Damian Porcari

(57) ABSTRACT

A method and system for freeze protecting liquid $NO_x$ reductants, preferably used in vehicle applications, wherein a liquid $NO_x$ reductant, carried onboard a vehicle exposed to cold weather conditions, is heated by existing thermal energy generated by fuel compression. The heated fuel heats a potentially frozen reductant and the liquid reductant is supplied to an exhaust gas pipe in front of a catalyst for reducing $NO_x$ on the surface of the catalyst and catalytically converted into environmentally safe nitrogen and water.

20 Claims, 2 Drawing Sheets

METHOD AND SYSTEM FOR FREEZE PROTECTING LIQUID $NO_x$ REDUCTANTS FOR VEHICLE APPLICATION

BACKGROUND OF INVENTION

1. Field of the Invention

This invention relates to a method and system for freeze protecting liquid $NO_x$ reductants and, more specifically, to a method and system for freeze protecting liquid $NO_x$ reductants used in vehicle applications.

2. Background Art

Diesel engines are typically more efficient than gasoline engines, with regard to fuel economy and emit less greenhouse gasses. However, diesel engines typically produce emissions containing higher concentrations of nitrogen oxides ($NO_x$) compared to gasoline engines fitted with three-way catalysts. Future pollution control regulations may necessitate reducing the amount of $NO_x$ and particulate emissions produced by diesel engines.

One method that has been employed to remove $NO_x$ from diesel exhaust utilizes selective catalytic reduction (SCR) of $NO_x$ with a liquid nitrogen containing reductant, such as aqueous urea. $NO_x$ and the liquid reductant are brought into contact with a selective catalyst and catalytically converted into environmentally safe nitrogen and water. When a liquid reductant is used, the liquid reductant is typically injected directly into the exhaust pipe in front of a catalyst to effect reduction of $NO_x$ on the surface of the catalyst or in the catalyst itself.

One major disadvantage of liquid reductants is that freezing of the reductant may occur. The freezing temperature varies relative to the composition and concentration of the dissolved reductant. For example, solutions having a urea content of about 32.5% in water (eutectic), typically freeze at about 12° F. (−11° C.). As can be readily expected, liquid reductant freezing is particularly a problem for the use of diesel vehicles in cold-weather climates when a liquid reductant is employed to help meet emission standards for $NO_x$. Also, expansion of the liquid reductant due to freezing can cause damage to the system components.

One approach to address the problem of supplying liquid reductant from a frozen reductant source uses heat to warm the liquid reductant above its freezing point. Heating methods have been developed using additional sources of energy, such as diesel fuel, to run a heater, or electrical supplemental heat to warm the liquid reductant, in cold weather conditions. Utilization of supplemental energy to warm the liquid reductant is disadvantageous because the supplemental energy requirement can result in an inefficient use of energy and decreased fuel economy. Supplemental heating by fuel sources is further disadvantageous since it requires a second fuel injection system thereby increasing costs and emissions. Another disadvantage is that the liquid reductant could be heated too much causing the liquid reductant to evaporate and therefore be ineffective.

It would be desirable to have a system that can employ liquid reductants for decreasing $NO_x$ emissions in cold weather climates without experiencing at least some of the above-mentioned disadvantages.

SUMMARY OF INVENTION

The present invention relates to a method and system for heating liquid reductant above its freezing temperature by utilizing existing heat generated by an engine under operating conditions, to enable use of the liquid reductant in cold weather conditions to reduce emissions of $NO_x$, in conjunction with a catalyst, without decreasing overall fuel economy or overheating the liquid reductant.

This invention relates, more specifically to a method for operating an exhaust gas purification system. The method comprises directing fuel, returning from a high pressure fuel injection system, wherein the fuel becomes heated, to a reductant source, transferring heat from the fuel to the reductant to liquefy frozen reductant, and supplying the liquid reductant to an exhaust pipe at a location in front of a catalyst for purification of exhaust gas.

In a preferred embodiment of the invention, a heat exchanger with a reservoir may be the source of reductant liquefied by heat supplied to the heat exchanger by a high pressure fuel injection system through a return fuel line. In another preferred embodiment, a urea supply line contained within a return fuel line may be the source of reductant rapidly liquefied by heated fuel returning from a high pressure fuel injection system through a return fuel line.

This invention also relates to a system for operating an exhaust gas purification system. The system comprises a source of fuel, a first source of liquid reductant, and an exhaust pipe for discharging exhaust gas from the vehicle. The system further comprises a second source of liquid reductant that is disposed between the first source of liquid reductant and the exhaust pipe, a high pressure fuel injection system disposed between the fuel source and the second liquid reductant source, a first conduit fluidly connecting the fuel source with the high pressure fuel injection system, a second conduit fluidly connecting the high pressure injection system with the fuel source, and a third conduit fluidly connecting the first liquid reductant source with the exhaust pipe. The system further comprises a first high pressure fuel pump to deliver fuel from the fuel source through the high pressure fuel injection system, past the second liquid reductant source, returning to the fuel source. The compression of the fuel in the high pressure fuel injection system heats the fuel. The system further comprises a second pump to deliver liquid reductant from the second liquid reductant source to the exhaust pipe.

The above objects and other objects, features, and advantages of the present invention are readily apparent from the following detailed description of the best mode for carrying out the invention when taken in connection with the accompanying drawings.

DETAILED DESCRIPTION

Figure 1:
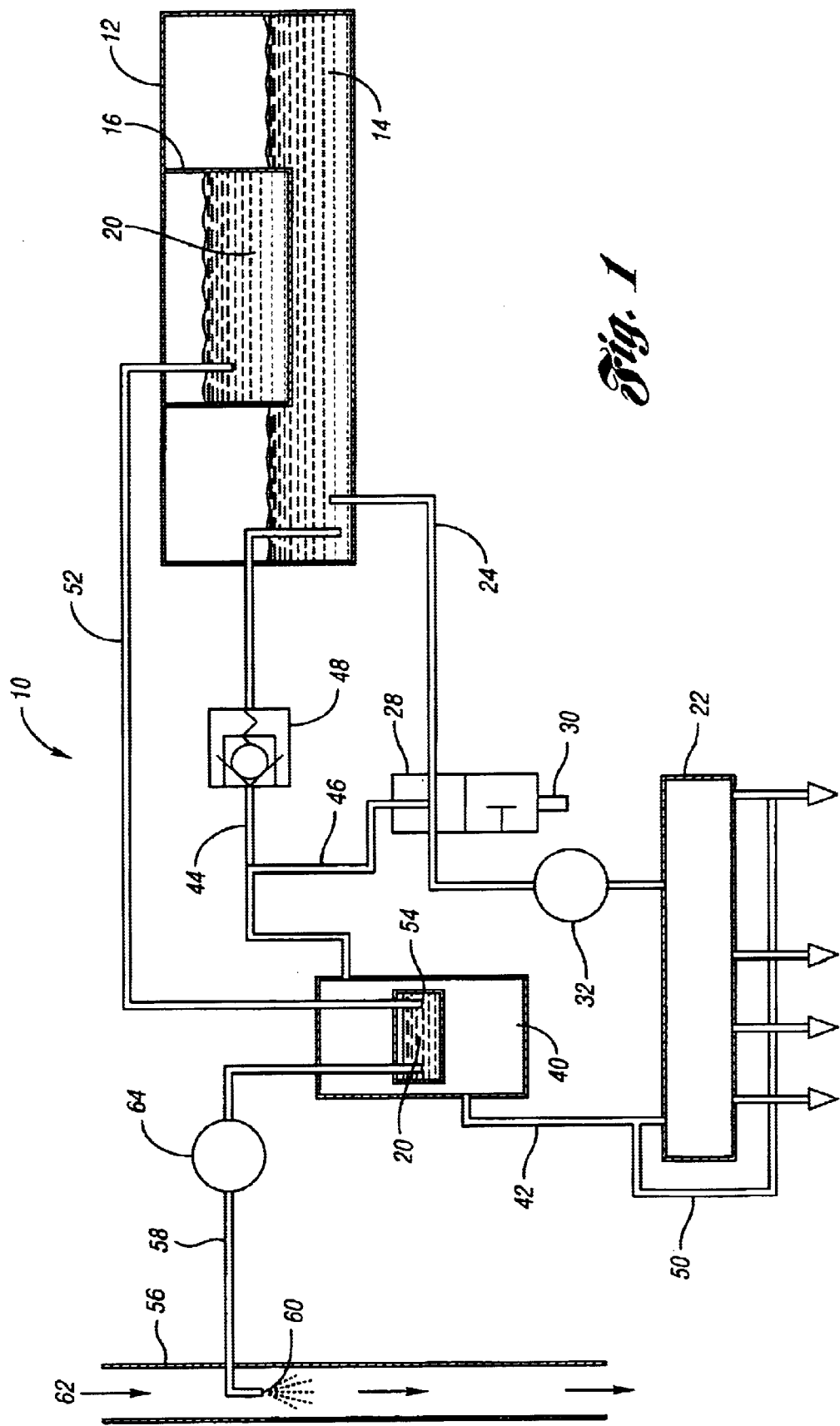
FIG. 1 illustrates a schematic diagram of a first embodiment of the invention.

Referring now to FIG. 1, the general arrangement of a fuel and liquid reductant delivery system 10 of a preferred embodiment of the present invention is illustrated. While the system 10 of the present invention may be used with any engine capable of creating $NO_x$ emissions, the present invention is particularly well-suited for use with internal combustion engines with high pressure fuel injection systems.

As shown in FIG. 1, the system 10 comprises a diesel fuel tank 12 that holds diesel fuel 14. In the illustrated embodiment, a reductant tank 16, that holds liquid reductant 20, is positioned within the diesel fuel tank 12. At engine startup, the temperature of the diesel fuel 14 ranges from ambient temperature to fuel tank 12 operating temperature, depending on the length of time the engine has been off. Ambient temperature is typically between about −30° C. and about 40° C. The diesel fuel tank 14 operating temperature is typically between ambient temperature and about 60° C. Positioning the reductant tank 16 within the diesel fuel tank 12 provides, additional, natural insulation for the reductant in the reductant tank 16, by the diesel tank 12 itself and also from the diesel fuel 14 within the tank 12. While placement of the reductant tank 16 within the diesel fuel tank 12 is a preferred location for the reductant tank 16, alternative locations for the reductant tank 16 within a vehicle may also be used, such as, but not limited to, locations capable of being exposed to heat during vehicle operation or locations that provide relatively high levels of protection from direct exposure to the external environment. Examples of alternative protected locations can be found in the engine compartment, as well as in the passenger compartment, provided that the temperature at these locations remains about at, and more preferably below, the liquid reductant decomposition or boiling temperature.

The system 10 further includes a high pressure fuel injection system 22 and a diesel fuel supply line 24 extending between and fluidly connecting the high pressure fuel injection system 22 and the diesel fuel tank 12. A switching valve 28 with a temperature switch 30 is disposed between the diesel fuel tank 12 and the high pressure fuel injection system 22.

A high pressure fuel pump 32 is preferably disposed between the high pressure fuel injection system 22 and the diesel fuel tank 12. A preferred high pressure fuel injection system 22 is a common rail injection system, but the high pressure fuel injection system 22 may be any high pressure fuel injection system known to those skilled in the art. The high pressure fuel pump 32 pumps the diesel fuel 14 through the system 10.

In a first embodiment, the system 10 further includes a heat exchanger 40 fluidly connected to the high pressure fuel injection system 22 by a fuel injection system return line 42. An injector return line 50 is disposed between the high pressure fuel injection system 22 and the fuel injection system return line 42. The heat exchanger 40 is also fluidly connected to diesel fuel tank 12 by a diesel fuel return line 44. The heat exchanger 40 is also fluidly connected to the switching valve 28 by a diesel fuel recirculation return line 46. A check valve 48 is disposed between the heat exchanger 40 and the diesel fuel tank 12 to help selectively direct the flow of diesel fuel 14 from the heat exchanger 40 to the diesel fuel tank 12 or the switching valve 28.

The system 10 further includes a reductant supply line 52 for fluidly connecting the reductant tank 16 to the heat exchanger 40. A reductant reservoir 54, schematically illustrated in FIG. 1, is disposed within the heat exchanger 40. The heat exchanger 40 and an exhaust gas pipe 56 are connected by a reductant dispensing line 58. An injection device 60 is disposed at the end of the reductant dispensing line 58 to direct liquid reductant 20 into the exhaust gas pipe 56. A reductant pump 64 is disposed between the heat exchanger 40 and the injection device 60. Alternatively, the reductant pump 64 could be disposed within the heat exchanger 40. The reductant pump 64 directs (i.e., pumps) the liquid reductant 20 to the injection device 60.

Under operation conditions, diesel fuel 14 from the diesel tank 12 is supplied through the diesel fuel supply line 24 past the switching valve 28 and into the high pressure fuel injection system 22 by operation of the high pressure fuel pump 32. Diesel fuel 14 warming occurs due to compression of the diesel fuel 14 by the high pressure fuel pump 32. The temperature of the diesel fuel 14 remains below the boiling temperature of the diesel fuel 14, i.e., typically below 70° C. The typical maximum operating temperature for the high pressure fuel injection system 22 is about 60° C. The diesel fuel 14 begins to warm within a few seconds of the vehicle startup, depending on the diesel fuel 14 flow rate.

From the high pressure fuel injection system 22, diesel fuel 14 can be injected into the combustion chamber of the engine (not shown) or supplied to the heat exchanger 40 through the fuel injection system return line 42. This invention utilizes existing heat generated by the compression of the diesel fuel 14 to supply heat to the reductant 20. In an embodiment of the invention, as illustrated in FIG. 1, the heat exchanger 40 is incorporated into the diesel fuel return pathway between the fuel injection system return line 42 and the diesel fuel return line 44 to enable use of the existing heat to warm the reductant 20 by thermal transfer of heat from the diesel fuel 14 in the heat exchanger 40. The injector return line 50 circulates fuel from the injectors to the fuel injection system return line 42.

The reductant 20 is supplied to the heat exchanger 40 from the reductant tank 16 through the reductant supply line 52 by operation of the reductant pump 64. In the heat exchanger 40, the warmed fuel 14 comes into contact with the reductant reservoir 54 and thermal energy is transferred from the heated diesel fuel 14 to the reductant 20 in the reservoir 54 to liquefy frozen reductant 20 if the temperature of the reductant 20 drops below its respective freezing point and to maintain a supply of liquid reductant 20 for exhaust gas reduction. The heat exchanger 40 allows relatively rapid warming of the reductant 20 using existing thermal energy from the compressed diesel fuel 14 without causing the reductant 20 to reach excessive temperatures that would vaporize or decompose reductant 20. When the reductant 20 is a water-based solution, the uppermost temperature allowed for the solution to remain a liquid is the decomposition or hydrolysis temperature. Preferably, because the temperature of the compressed fuel remains below 90° C., the heating of the reductant 20 with diesel fuel 14 in the heat exchanger 40 does not cause the reductant 20 to exceed its decomposition or hydrolysis temperature.

The warmed reductant 20 is supplied from the heat exchanger 40 through the reductant supply line 58 to the injection device 60. The liquid reductant 20 is injected through the injection device 60 directly into the exhaust gas pipe 56 in front of a catalyst reduction unit (not shown). The injection device 60 can be any suitable device capable of controlling flow of the reductant 20 from the reductant dispensing line 58 into the exhaust gas pipe 56. The exhaust gas 62 passes through the exhaust gas pipe 56 to a catalyst reduction unit (not shown) where the reductant 20 reduces the $NO_x$ on the surface of the catalyst to form environmentally safe nitrogen and water.

Diesel fuel 14 used to heat the reductant 20 in the heat exchanger 40 continues circulating, at about ambient pressure conditions and above fuel cloud point and below the boiling temperature, from the heat exchanger through the diesel fuel return line 44 to the diesel fuel tank 12 and/or the diesel fuel 14 recirculates through the diesel fuel recirculation return line 46 to the switching valve 28 back to the high pressure fuel injection system 22 by operation of the high pressure fuel pump 32. The check valve 48 provides resistance to help selectively control the diesel fuel 14 flow to the switching valve 28 when the temperature of the diesel fuel is low, as determined by the temperature switch 30, and to control the diesel fuel flow to the diesel fuel tank 12 when diesel fuel temperature is sufficiently high. The switching point may be set, preferably at about 0° C.–50° C. for this embodiment of the invention.

Figure 2:
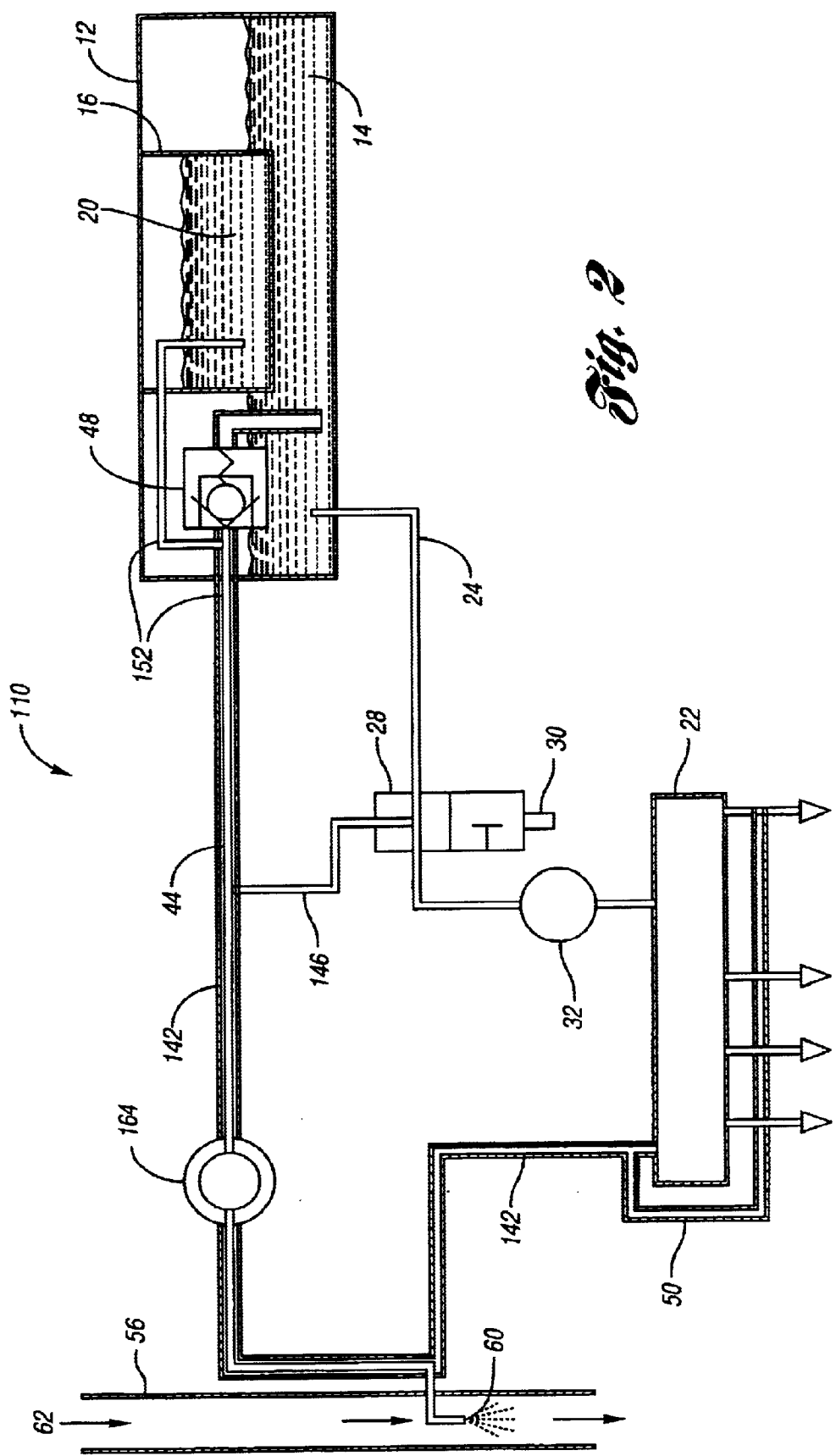
FIG. 2 illustrates a schematic diagram of a second embodiment of the invention.

Referring now to FIG. 2, a second embodiment of the present invention is shown. The second embodiment has many components that are substantially the same as corresponding components of the first embodiment. This is indicated by the use of the same reference numbers in FIG. 2 as were used in FIG. 1.

The system 110 illustrates a general arrangement of a fuel and liquid reductant delivery system of a preferred embodiment of the present invention. Similar to the embodiment of the invention illustrated in FIG. 1, the system 110 comprises a diesel fuel tank 12 that holds diesel fuel 14. The system 110 further includes a high pressure fuel injection system 22 and a diesel fuel supply line 24 extending between and fluidly connecting the high pressure fuel injection system 22 and the diesel fuel tank 12. A switching valve 28 with a temperature switch 30 is disposed between the diesel fuel tank 12 and the high pressure fuel injection system 22. A high pressure fuel pump 32 is preferably disposed between the high pressure fuel injection system 22 and the diesel fuel tank 12.

The system 110 further comprises a fuel injection return line 142 that fluidly connects the high pressure fuel injection system 22 and the diesel fuel tank 12. Similar to system 10, an injector fuel return line 50 is disposed between the fuel injection system 22 and the fuel injection system return line 142. The fuel injection system return line 142 is also fluidly connected to the switching valve 28 by diesel fuel recirculation line 146.

The system 110 further includes a reductant supply line 152 for fluidly connecting the reductant tank 16 to an injection device 60. The reductant supply line 152 is positioned within, or coaxial with, the high pressure fuel injection system return line 142. A reductant pump 164 within the reductant supply line 152 pumps the liquid reductant 20 through the reductant supply line 152 to the injection device 60. The injection device 60 is disposed at the end of the reductant dispensing line 58 to direct liquid reductant 20 into the exhaust gas pipe 56.

Under operation conditions for the system 110, the thermal energy from the heated returning diesel fuel 12 is transferred to the reductant supply line 152 and the reductant contained therein to relatively rapidly liquefy frozen reductant 20 if the temperature of the reductant 20 drops below its respective freezing point and to maintain a supply of liquid reductant 20 for exhaust gas reduction. The system 110 provides a large surface area of contact between the fuel injection return line 142 containing heated return diesel fuel 12 and the reductant supply line 152, resulting in relatively rapid liquefaction of frozen reductant for faster introduction of the liquid reductant into the exhaust gas. The system 110 also provides greater protection against liquid reductant freezing through additional insulation from ambient temperatures.

In a preferred embodiment of the invention, the liquid $NO_x$ reductant 20 is an aqueous solution of urea. Aqueous urea solutions and hydrolysis products formed therefrom may be used as a source of ammonia to effect reduction of the $NO_x$. Aqueous solutions of urea may be employed up to the solubility limit of the urea. Typically, the urea solution will contain from about 2 to about 65% reagent based on the weight of the solution, more preferably from about 5% to about 45% urea by weight. Most preferably, the concentration for mobile uses is about 32.5% urea by weight which exhibits the lowest freeze point without precipitation of urea.

While aqueous urea solutions and the hydrolysis products formed therefrom are preferred for $NO_x$ reduction, alternative commercial solutions of hydrolysis products, and combinations thereof, may be used to supply a liquid reductant to effect reduction of $NO_x$ on the surface of the catalyst. Commercial solutions of liquid reductants include, but are not limited to, solutions containing: ammonium carbonate, ammonium bicarbonate, ammonium carbamate, ammonium cyanate, ammonium salts of organic acids, including formic and acetic acid, and cyanuric acid.

In an embodiment of the invention, in which the liquid reductant may potentially freeze due to long-term exposure to extremely cold conditions, elastic materials with expansion coefficients higher than that of the liquid reductant can be used to form certain components of the system 10 and 110, such as, the reductant supply lines 52 and 152, to prevent the reductant-containing components against damage from bursting. Reductant-containing components include, but are not limited to, the reductant tank 16, the reductant supply line 52 and 152, the heat exchanger 40, the reductant reservoir 54, the reductant dispensing line 58, and the injection device 60. The expansion behavior of aqueous urea solutions are similar to the behavior of water. The thermal coefficient of expansion for ice is about $50 \times 10^{-6}/K$. Suitable elastic materials include, but are not limited to, any organic, inorganic, metallic materials or mixtures or combinations of those which are suited or achieve the prescribed target. Especially preferred are polymeric materials that have a thermal expansion coefficient higher than that of the aqueous urea solution and also are chemically compatible with aqueous urea. These materials include, but are not limited to, polyethylene, polypropylene, nylon, and Teflon.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for operating an exhaust gas purification system, said method comprising:

directing heated fuel from a high pressure fuel injection system to a reductant source;

heating frozen reductant within the reductant source with thermal energy transferred from the heated fuel; and supplying the reductant to an exhaust gas pipe in front of a catalyst for purification of exhaust gas;

the reductant source being in fluid communication with a reductant tank, the reductant tank being located within a fuel tank and the reductant source having at least a substantial portion located outside the fuel tank.

2. The method of claim 1 wherein the reductant source is a reservoir within a heat exchanger.

3. The method of claim 1 wherein the high pressure fuel injection system is a common rail fuel injection system.

4. The method of claim 1 wherein the reductant is an aqueous urea solution.

5. The method of claim 1 further comprising system components containing the reductant, wherein the components are made from an elastic material with an expansion coefficient higher than the expansion coefficient of the reductant to prevent damage to the components when the reductant freezes.

6. The method of claim 1 wherein the reductant source is a reductant supply line contained within a high pressure fuel injection system return line.

7. The method of claim 6 wherein the reductant supply line is made from an elastic material with an expansion coefficient higher than the expansion coefficient of the reductant.

8. A system for use with the method of claim 1, said system comprising:
- a source of fuel;
- a first source of liquid reductant;
- an exhaust pipe for discharging exhaust gas from the vehicle;
- a second source of liquid reductant, the second source being disposed between the first source of liquid reductant and the exhaust pipe;
- a fuel tank containing the source of fuel;
- a reductant tank containing the first source of liquid reductant, wherein the reductant tank is located within the fuel tank;
- a high pressure fuel injection system disposed between the fuel source and the second liquid reductant source;
- a first conduit fluidly connecting the fuel source with the high pressure fuel injection system;
- a second conduit fluidly connecting the high pressure injection system with the fuel source;
- a third conduit fluidly connecting the first liquid reductant source with the exhaust pipe;
- a first high pressure fuel pump to deliver fuel from the fuel source through the high pressure fuel injection system, past the second liquid reductant source, returning to the fuel source, whereby compression of the fuel in the high pressure fuel injection system heats the fuel; and
- a second pump to deliver liquid reductant from the second liquid reductant source to the exhaust pipe.

9. The system of claim 8 wherein the second liquid reductant source is a reservoir within a heat exchanger.

10. The system of claim 8 further comprising a reductant tank containing the source of liquid reductant wherein the reductant tank is positioned in a vehicle in a location adapted for being exposed to heat generated during vehicle operation and protected from direct exposure to ambient temperatures.

11. The system of claim 8 wherein the liquid reductant is an aqueous urea solution.

12. The system of claim 8 further comprising system components containing the reductant, wherein the components are made from an elastic material with an expansion coefficient higher than the expansion coefficient of the reductant to prevent damage to the components when the reductant freezes.

13. The system of claim 8 wherein a conduct extends between and fluidly connects the first and second sources of liquid reductant.

14. The system of claim 8 wherein the second liquid reductant source is a reductant supply line contained within a high pressure fuel injection system return line.

15. The system of claim 14 wherein the reductant supply line is made from an elastic material with an expansion coefficient higher than the expansion coefficient of the reductant.

16. A system for operating an exhaust gas purification system, said system comprising:
- a source of fuel;
- a first source of liquid reductant;
- an exhaust pipe for discharging exhaust gas from the vehicle;
- a second source of liquid reductant, the second source being disposed between the first source of liquid reductant and the exhaust pipe;
- a fuel tank containing the source of fuel;
- a reductant tank containing the first source of liquid reductant, wherein the reductant tank is located within the fuel tank;
- a high pressure fuel injection system disposed between the fuel source and the second liquid reductant source;
- a first conduit fluidly connecting the fuel source with the high pressure fuel injection system;
- a second conduit fluidly connecting the high pressure injection system with the fuel source;
- a third conduit fluidly connecting the first liquid reductant source with the exhaust pipe;
- a first high pressure fuel pump to deliver fuel from the fuel source through the high pressure fuel injection system, past the second liquid reductant source, returning to the fuel source, whereby compression of the fuel in the high pressure fuel injection system heats the fuel; and
- a second pump to deliver liquid reductant from the second liquid reductant source to the exhaust pipe.

17. The system of claim 16 wherein the second liquid reductant source is a reservoir within a heat exchanger.

18. The system of claim 16 further comprising a fuel tank containing the source of fuel and a reductant tank containing the source of liquid reductant, wherein the reductant tank is located within the fuel tank.

19. The system of claim 16 wherein the second liquid reductant source is a reductant supply line contained within a high pressure fuel injection system return line.

20. The system of claim 19 wherein the reductant supply line is made from an elastic material with an expansion coefficient higher than the expansion coefficient of the reductant.

* * * * *